(12) United States Patent
LaBerge

(10) Patent No.: US 6,321,315 B1
(45) Date of Patent: Nov. 20, 2001

(54) METHOD AND APPARATUS TO REDUCE MEMORY READ LATENCY

(75) Inventor: Paul A. LaBerge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/409,523

(22) Filed: Sep. 30, 1999

(51) Int. Cl.$^7$ ................................................. G06F 12/00
(52) U.S. Cl. .................................... 711/167; 710/127
(58) Field of Search ............................ 711/167; 710/33, 710/34, 56, 107, 127, 130

(56) References Cited

U.S. PATENT DOCUMENTS

| | | | | |
|---|---|---|---|---|
| 5,003,475 | * | 3/1991 | Kerber et al. | 364/413.21 |
| 5,019,965 | * | 5/1991 | Webb, Jr. et al. | 364/200 |
| 5,469,544 | * | 11/1995 | Aatresh et al. | 395/290 |
| 5,664,122 | * | 9/1997 | Rabe et al. | 395/308 |
| 5,734,849 | * | 3/1998 | Butcher | 395/308 |
| 5,862,358 | * | 1/1999 | Ervin et al. | 395/309 |
| 5,905,766 | * | 5/1999 | Nguyen | 375/354 |
| 5,909,563 | * | 6/1999 | Jacobs | 395/309 |
| 6,029,253 | * | 2/2000 | Houg | 713/600 |
| 6,065,070 | * | 5/2000 | Johnson | 710/22 |

OTHER PUBLICATIONS

"Dynamic Scatter Gather Table," IBM Technical Disclosure Bulletin, vol. 33, pp. 309–311, Aug. 1990.*

* cited by examiner

*Primary Examiner*—Glenn Gossage
*Assistant Examiner*—Stephen Elmore
(74) *Attorney, Agent, or Firm*—Trop, Pruner & Hu, P.C.

(57) ABSTRACT

A memory controller to reduce the latency associated with multi-quanta system memory read operations is described. The memory controller transfers a first quantum of data (e.g., 64-bits or 32-bits) toward a requesting device upon its receipt from system memory. Subsequent data quanta may be aggregated to more fully utilize intra-memory controller data transfer pathways (e.g., 256-bits or 128-bits). Because intra-memory controller data pathways are wider than external data transfer pathways (e.g., memory bus and processor bus data paths), an indication of which portion or portions of the transferred data is valid is forwarded with the data.

27 Claims, 4 Drawing Sheets

| | DESCRIPTION | TIME (NSEC) |
|---|---|---|
| 500 | DELAY, OR DIFFERENCE IN TIME, BETWEEN SYSTEM CLOCK 318 AND ADDRESS CLOCK 316. | 2.00 |
| 502 | TIME BETWEEN ADDRESS LEAVING LATCH 300 (AND ASSOCIATED OUTPUT BUFFER, NOT SHOWN IN FIG. 3) AND SYSTEM CLOCK 318 LEAVING CLOCK CIRCUIT 302 (ADDRESS CLOCK 316) | 3.75 |
| 504 | TIME DELAY BETWEEN WHEN MEMORY 206 CAPTURES THE ADDRESS SIGNAL AND WHEN IT GENERATES A DATA STROBE SIGNAL 322. | 0.75 |
| 506 | TIME REQUIRED FOR ADDRESS CLOCK 316 TO PROPAGATE TO THE MEMORY (VIA ADDRESS BUS 314) AND FOR THE DATA TO PROPAGATE BACK TO THE MEMORY INTERFACE (VIA DATA BUS 322). | 2.9 |
| 508 | TIME REQUIRED FOR THE DATA SIGNAL (FROM MEMORY 206) TO PROPAGATE THROUGH MEMORY INTERFACE INPUT DATA BUFFER 320. | 0.65 |
| 510 | TIME DELAY BETWEEN THE MEMORY INTERFACE RECEIVING DATA FROM THE MEMORY AND CAPTURING THAT DATA IN LATCH 306 (VIA OUTPUT OF STROBE CIRCUIT 308). | 1.88 |
| 512 | TIME REQUIRED TO TRANSFER DATA FROM LATCH 306 TO LATCH 310 (INCLUDING DATA INPUT MULTIPLEXER PROPAGATION TIME -- MULTIPLEXERS NOT SHOWN IN FIG. CC). | 2.35 |
| 514 | SYSTEM CLOCK JITTER (ATTRIBUTABLE TO SOURCES IN AND OUT OF SYSTEM CONTROLLER 204). | 0.45 |
| 516 | TIME TO FORWARD A FIRST QUANTUM OF CACHE LINE DATA: | 14.73 |
| 518 | TIME TO RECEIVE SECOND QUANTUM OF DATA FROM SYSTEM MEMORY 206. | 3.75 |
| 520 | TIME TO FORWARD A FIRST AND SECOND QUANTUM OF CACHE LINE DATA: | 18.48 |

FIG. 5

METHOD AND APPARATUS TO REDUCE MEMORY READ LATENCY

BACKGROUND

The invention relates generally to computer system memory read operations and more particularly, but not by way of limitation, to a method and apparatus for reducing memory read latency.

If memory read latency is defined as the time lag between when a device issues a request to memory for data and the moment the data begins to be received by the device, then latency represents a key indication of a computer system's performance. The lower the latency, generally the better the performance. A naïve approach to minimizing memory read latency would be to immediately transfer, to the requesting device, each quantum of data as it is provided by the memory. One reason this approach is not taken in modern computer systems is that memory access operations are mediated by system controllers having internal data transfer paths greater than that of either the memory or the requesting device. To obtain high data transfer rates, these controllers aggregate data received from, for example, system memory before forwarding it to a requesting device. The act of aggregation creates a latency that otherwise would not be present. This latency is particularly problematic for processor initiated memory read operations because, as a computer system's primary computational engine, if the processor is waiting for data no useful work is being performed.

Referring to FIG. 1, prior art computer system 100 includes processor 102, system memory 104, system controller 106 (incorporating processor interface 108, memory interface 110 and primary bus interface 112), processor bus 114 coupling processor 102 to processor interface 108, memory bus 116 coupling system memory 104 to memory interface 110 and primary bus 118 coupling other system devices 120 (e.g., network interface adapters and/or a secondary bus bridge circuit and components coupled thereto) to processor 102 and system memory 104 via primary bus interface 112.

In many current systems such as computer system 100, processor bus 114, memory bus 116 and primary bus 118 are 64-bit structures (another common primary bus width is 32-bits). At the same time, system controller 106 may utilize 128-bit (or greater) internal data transfer paths. Because of this, data received from system memory 104 during a memory read operation is aggregated by memory interface 110 before being forwarded to a destination interface and, ultimately, to the requesting device. For example, if processor 102 initiates a memory read request for a 32-byte block of data (a common size for a cache line), after memory interface 110 receives the first 8-bytes (64-bits) from system memory 104, it waits until it receives the second 8-bytes before sending the entire 16-byte unit to processor interface 108 and, ultimately, processor 102.

The delay or latency caused by the act of aggregating successive data units received from system memory can result in processor stalls, thereby is reducing the operational/computational efficiency of the computer system. Thus, it would be beneficial to provide techniques (methods and apparatus) to reduce memory read latency in a computer system.

SUMMARY

In one embodiment the invention provides a memory controller method to reduce the latency associated with multi-quanta system memory read operations. The method includes receiving a first quantum of data having a width from a memory device, transferring the first quantum of data to a device on a first clock, receiving a second and third quanta of data from the memory device (each of the second and third quanta having the width), and transferring the second and third quanta of data to the device on a successive clock. Because intra-memory controller data pathways are wider than external data transfer pathways (e.g., memory bus and processor bus data paths), an indication of which portion or portions of the transferred data is valid is forwarded with the data. In another embodiment, the invention provides a memory controller apparatus to provide reduced latency associated with multi-quanta system memory read operations.

BRIEF DESCRIPTION OF THE DRAWINGS

FIG. 5 shows illustrative timing data for data retrieval operations in accordance with one embodiment of the invention.

DETAILED DESCRIPTION

A memory controller in accordance with the invention reduces the latency associated with multi-quanta system memory read operations by transferring a first quantum of data (e.g., 64-bits or 32-bits) toward a requesting device upon its receipt from system memory. Subsequent data quanta may be aggregated to more fully utilize intra-memory controller data transfer pathways (e.g., 256-bits or 128-bits). Because intra-memory controller data pathways are wider than external data transfer pathways (e.g., memory bus and processor bus data paths), an indication of which portion or portions of the transferred data is valid is forwarded with the data.

Figure 1:
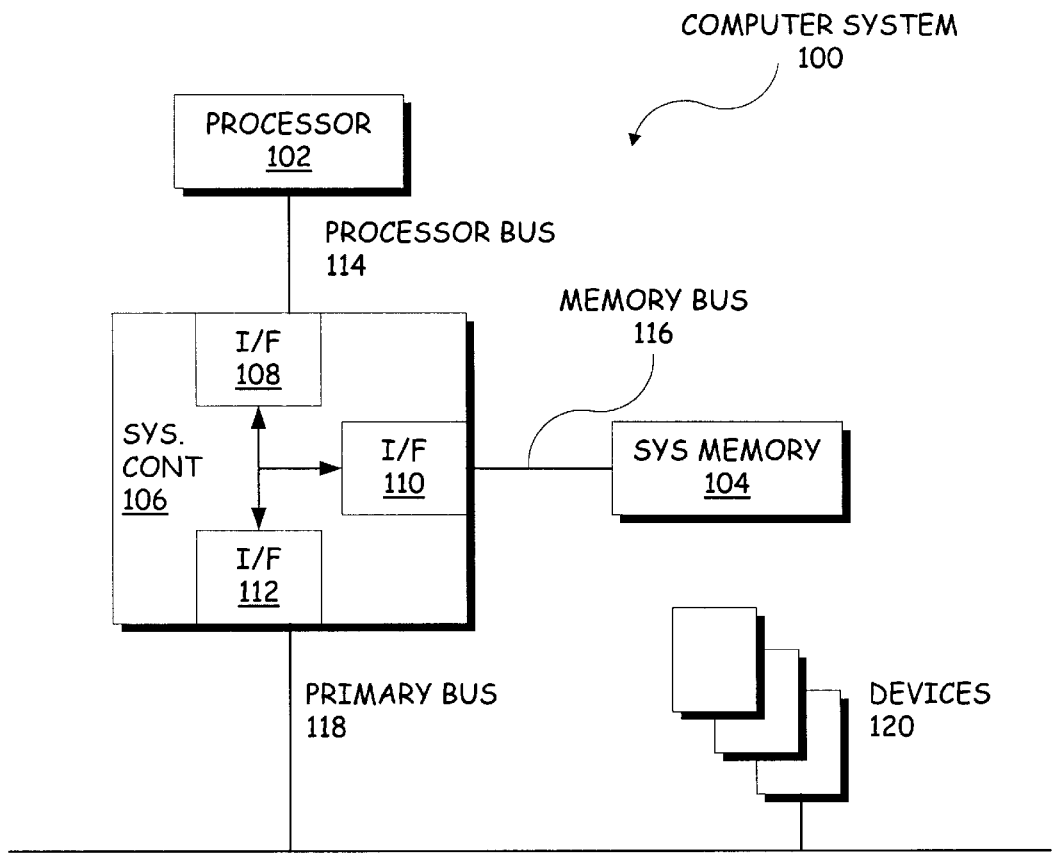
FIG. 1 shows a block diagram of a prior art computer system.
Figure 2:
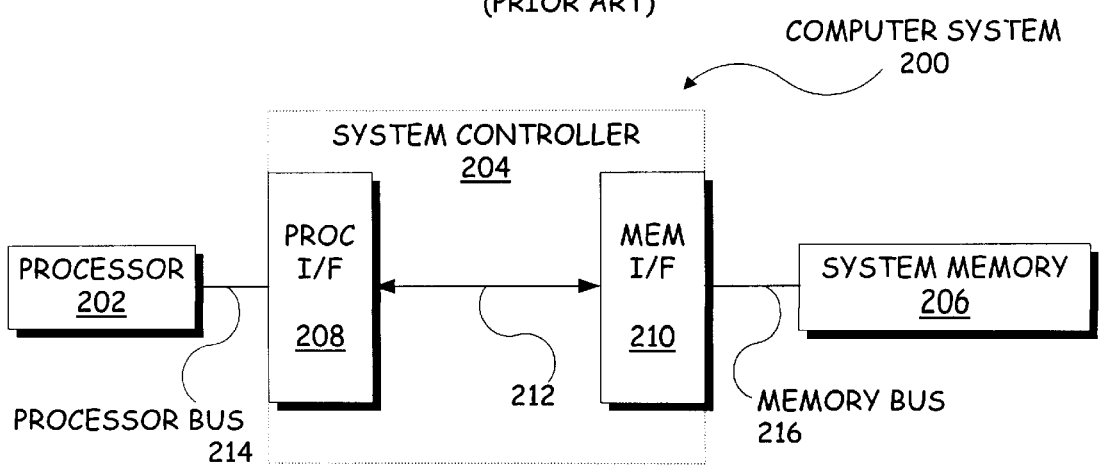
FIG. 2 shows a block diagram of a computer system in accordance with one embodiment of the invention.

Referring to FIG. 2, in one embodiment of the invention computer system 200 includes one or more processor units (only unit 202 is shown for clarity), system controller 204 and system memory 206. System controller 204, in turn, includes processor interface 208, memory interface 210 and internal data transfer paths 212. Processor unit 202 is coupled to processor interface 208 by processor bus 214 and system memory 206 is coupled to memory interface 210 by memory bus 214.

For illustrative purposes only, the following embodiments of the invention are described in terms of processor initiated cache line retrieval operations, where a cache line is 256-bits, internal system controller data transfer pathways 212 are 128-bits, processor bus 214 and memory bus 216 provide 64-bit data transfer capability and system memory 206 comprises double data rate (DDR) dynamic random access memory (DRAM). Thus, for discussion, it is assumed that each cache line retrieval operation requires the retrieval of four (4) 64-bit quanta from system memory 206.

Figure 3:
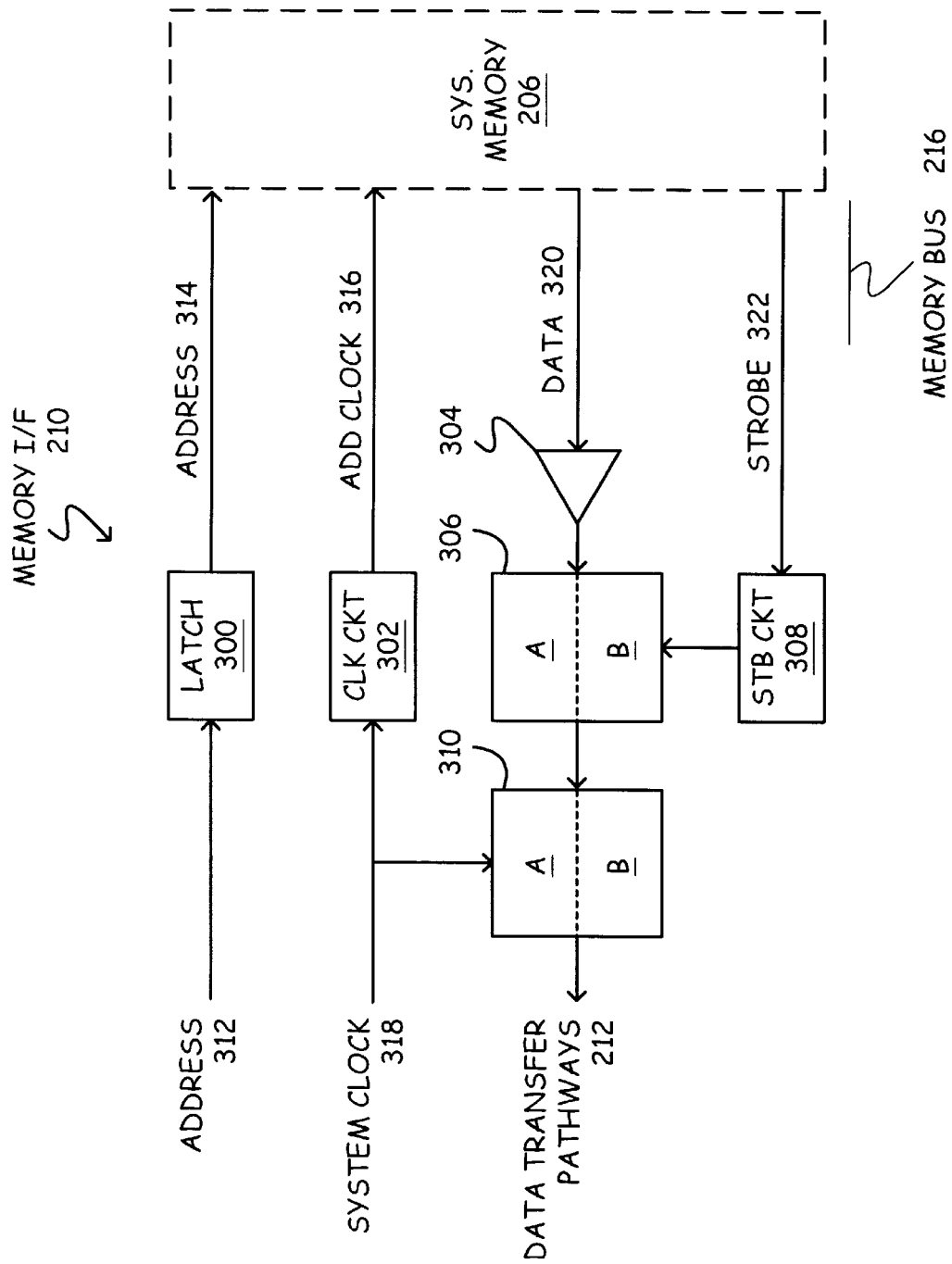
FIGS. 3 shows an expanded block diagram for the memory interface of FIG. 2.

Referring to FIG. 3, an expanded block diagram of memory interface 210 shows address latch 300, clock circuit 302, 64-bit input data buffer 304, a first 128-bit data latch 306 (for storing two 64-bit quanta of data, A and B), strobe circuit 308 and a second 128-bit data latch 310 (for storing two 64-bit quanta of data, A and B). Address latch 300 is adapted to capture address signal 312 from a device requesting access to system memory 210 (e.g., processor 202 via processor interface 208) so that it may be supplied to system memory 206 via address bus 314. Clock circuit 302 is adapted to generate address clock signal 316 which system memory 206 uses to capture the address supplied by address latch 300. In one embodiment, clock circuit 302 is a flip-flop configured to supply a latching signal (e.g., a rising clock edge) to system memory 206 on the falling edge of system clock signal 318, where system clock 318 is that clock signal, (or a synchronized version thereof) used to drive processor 202 and system controller 204. Input data buffer 304 is adapted to electrically buffer/isolate data signals transmitted from system memory 206 to memory interface 210 via data bus 320. Data latch 306, in cooperation with strobe circuit 308, is adapted to store 128-bits of data from system memory 210. In particular, strobe circuit 308 (perhaps adjustably) delays strobe signal 322 so that each 64-bit quantum of data received by latch 306 (via data bus 322 and input buffer 304) is reliably captured (e.g., in the data signal's "data eye"). Data latch 310 is adapted to transfer data from the memory clock domain (i.e., data captured by data latch 306 by strobe signal 322) to the system clock domain (data latch 310 is driven by system clock 312) so that it may be routed via internal system controller data transfer pathways 212 to that interface unit (e.g., processor interface 208) coupled to the device whose system memory read request is being satisfied (e.g., processor 202).

Figure 4:
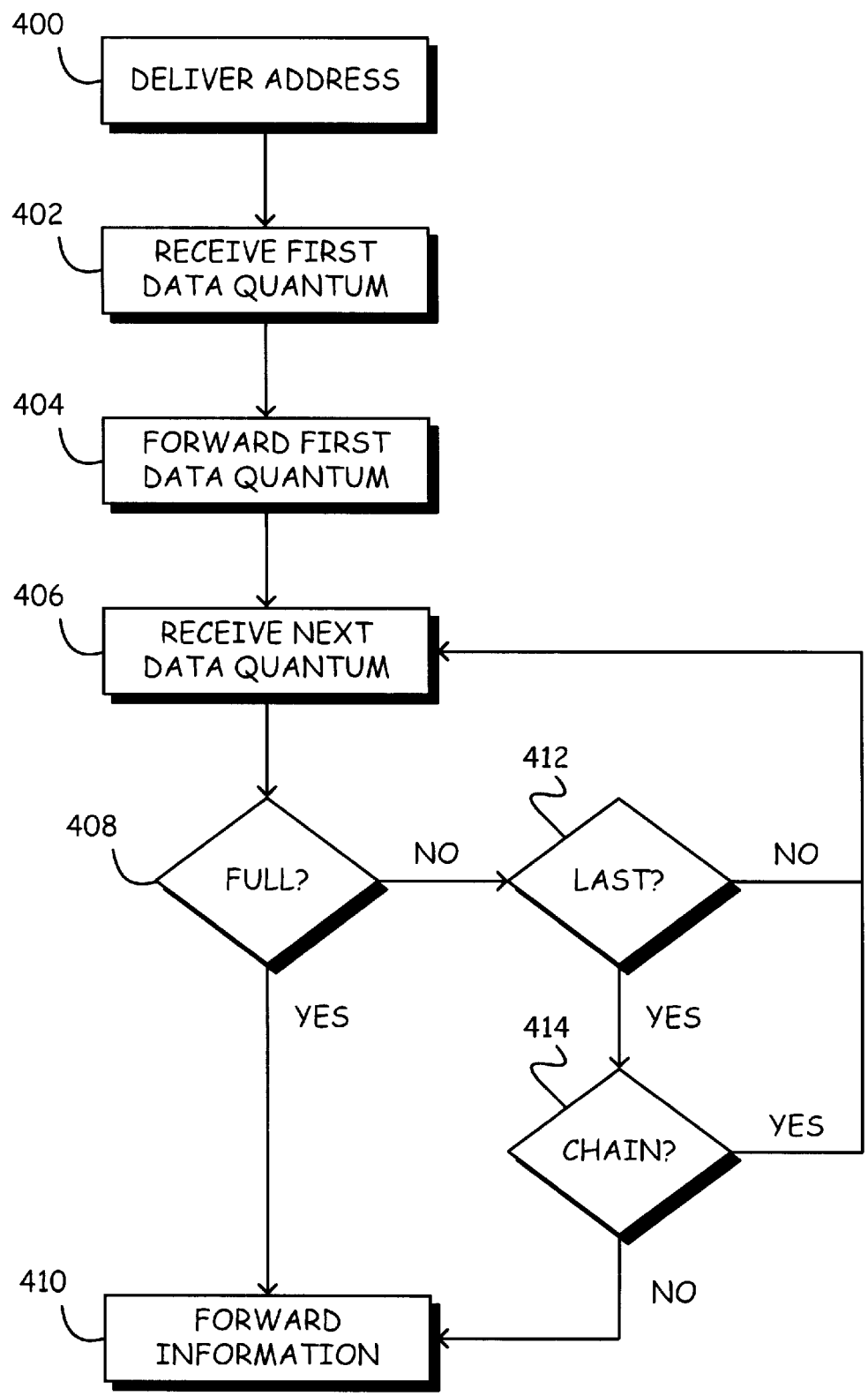
FIG. 4 shows a flow chart for one method in accordance with the invention to reduce read latency associated with cache line retrieval operations

Referring to FIG. 4, a flowchart of a method to reduce the latency associated with cache line read operations in accordance with the invention includes delivering an address to system memory 206 (block 400). The act of address delivery typically includes delivering both an address signal via address bus 314 and address clocking signal 316. In response, system memory 206 returns a first quantum of data to memory interface 210 (block 402).

Once the first quantum of data passes through buffer 304, is captured in latch 306 (portion A or portion B) and transferred to latch 310 (portion A or B), it is forwarded to processor interface 208 via internal system controller data transfer paths 212 without waiting for the cache line's second quantum of data to arrive (block 404). As a result, only that portion of the information forwarded to processor interface 208 corresponding to the first quantum of data is valid. An indication identifying the valid portion is sent with the forwarded data. In one embodiment the indication comprises two signals: the first signal is asserted if portion A of the transferred data is valid; the second signal is asserted if portion B of the transferred data is valid. In another embodiment, when data is transferred in "pairs" (e.g., two quanta, four quanta, six quanta, etc.), a single signal may be used to indicate a first portion (e.g., portion A) of the current transfer is valid and a second portion (e.g., portion B) of the next transfer is valid (see discussion below).

Following transfer of the first quantum of data, a next data quantum is received (block 406). If the newly received data fills the interface unit's internal data register—latches 306 and 310 (the "yes" prong of diamond 408), the entire register is forwarded to processor 202 via internal data pathways 212 (block 410). If the newly received data does not fill the internal transfer registers (the "no" prong of diamond 408), a check is made to determine if the newly received data quantum is the last quantum in the current cache line (diamond 412). If the newly received data is not the last quantum in the current cache line (the "no" prong of diamond 412), the acts of block 406 are repeated to obtain the next quantum of data associated with the current cache line retrieval operation.

If the newly received data is the last quantum in the current cache line (the "yes" prong of diamond 412), an additional check may be performed to determine if another processor initiated cache line retrieval operation is ready to be fetched from system memory 206 (diamond 414). If the next memory retrieval operation is not another cache line retrieval operation (the "no" prong of diamond 414), the newly received quantum of data is forwarded toward processor 202 (block 410). If the next memory retrieval operation is another cache line retrieval operation (the "yes" prong of diamond 414), the acts of block 406 are repeated to obtain the first quantum of data associated with the next cache line retrieval operation.

As mentioned above, memory interface 210 provides an indication identifying those portions of the transferred data that are valid (or invalid). In one embodiment, the indication comprises two signals as shown in Table 1. In this embodiment, whenever portion A of latch 310 (i.e., portion A of the transferred data) contains valid data, indicator A is asserted (represented by the value '1') and whenever portion A of latch 310 does not contain valid data, indicator A is not asserted (represented by the value '0' in FIG. Table 1). The validity/nonvalidity of latch 310's portion B is similarly indicated by the value of indicator B.

TABLE 1

An Illustrative Valid Data Indicator Technique

| Portion A of Latch 310 | Portion B of Latch 310 | Indicator A | Indicator B |
|---|---|---|---|
| Not Valid | Not Valid | 0 | 0 |
| Not Valid | Valid | 0 | 1 |
| Valid | Not Valid | 1 | 0 |
| Valid | Valid | 1 | 1 |

A second technique to provide an indication identifying those portions of the transferred data that are valid (or invalid) is shown in Table 2. In this embodiment, when the indicator signal is asserted (represented by the value '1') portion A of the current transfer is indicated as valid and portion B of the subsequent transfer is valid. Thus, a cache line retrieval operation comprised of four quanta of data may be transferred from memory interface 210 to processor interface 208 in the period of 3 system clocks: at clock 1 quantum 1 in portion A and not valid data in portion B of latch 310 is transferred along with an asserted indicator signal; at clock 2 the second and third quanta of data are transferred along with an asserted indicator signal; and at clock 3 the fourth quantum of data is transferred along with a not asserted indicator signal.

TABLE 2

An Illustrative Valid Data Indicator Technique

| Portion A of Latch 310 | Portion B of Latch 310 | Clock | Indicator |
|---|---|---|---|
| Not Valid | Valid | 1 | 1 |
| Valid | Valid | 2 | 1 |
| Valid | DON'T CARE | 3 | 0 |

It is noted that in the signaling scheme of Table 2 is possible because each cache line read operation requires the retrieval of a plurality of data quantum. It is further noted that the signaling scheme of Table 2 implements a transfer protocol in which the first quantum of data is transferred in portion A of intra-system controller pathways 212, and the last quantum of data is transferred in portion B. This, of course may be reversed. With respect to pipelined or chained operations (i.e., where more than a one cache line is retrieved in sequence by a common requestor device), the signaling schemes of both Table 1 and Table 2 permit this type of operation.

Typical timing data for a system such as that shown in FIGS. 2 and 3 having a 133 MHz system clock and a DDR DRAM system memory operating at 133 MHz (providing an effective data transfer rate of 266 MHz) is shown in FIG. 5. As indicated, it takes approximately 14.73 nanoseconds (nsec) 516 for a first quantum of data to be received and made available for transfer toward the requesting device (sum of 500 through 514). Synchronization to system clock 318, however, delays the actual transfer until the 15.0 nsec mark (corresponding to two complete clock cycles at 133 MHz).

If, as in prior art systems, transfer of the first data quantum is delayed until a second data quantum is received and combined with the first data quantum to fill memory interface data input registers, an additional 3.75 nsec 518 is needed (corresponding to the data transfer rate of a DDR memory operating at 133 MHz). The total time for such an operation is approximately 18.48 nsec 520 (the sum of 516 and 518). However, because this time is greater than two system clock cycles (15.0 nsec), the actual data transfer is delayed an additional (system) clock cycle—until 22.5 nsec. Thus, in comparison to conventional data transfer techniques, a memory interface in accordance with the invention is able to transfer a first data quantum an entire system clock cycle earlier. The reduced latency provided by a memory interface in accordance with the invention allows the requesting device to restart processing data a full clock cycle earlier. This savings in time can be significant to improving the data processing throughput of a computer system.

While the invention has been disclosed with respect to a limited number of embodiments, numerous modifications and variations will be appreciated by those skilled in the art. For example, a memory transfer technique in accordance with FIG. 4 is not limited to processor initiated cache line retrieval operations. The disclosed method is equally applicable to other types of devices making block oriented memory read requests, i.e., read requests that result in multiple data quanta being retrieved from system memory. Illustrative devices include Peripheral Component Interconnect (PCI) devices. Such devices are generally coupled to system memory via a system controller incorporating said interfaces. It is intended, therefore, that the following claims cover all such modifications and variations that may fall within the true sprit and scope of the invention.

What is claimed is:

1. A memory transfer method, comprising:
   receiving a first quantum of data having a width from a memory device;
   transferring the first quantum of data to a device on a first clock;
   receiving a second and third quanta of data from the memory device, each of the second and third quanta having the width;
   concurrently transferring both the second and third quanta of data to the device on a successive clock.

2. The method of claim 1, wherein the act of receiving the first quantum of data further comprises storing the first quantum of data in a first portion of a register, the register having a width greater than that of the first quantum of data.

3. The method of claim 2, wherein the act of transferring the first quantum of data further comprises indicating to the device that only the first portion of the register comprises valid data.

4. The method of claim 3, wherein the act of indicating to the device comprises asserting a signal to indicate that the first portion of the register comprises valid data.

5. The method of claim 4, wherein the act of asserting the signal further indicates that a second portion of the register comprises valid data on a successive clock.

6. The method of claim 2, wherein the act of storing the first quantum comprises storing the first quantum of data in a register having a width equal to twice the width of the quantum of data.

7. The method of claim 2, wherein the act of receiving a second and third quanta further comprises:
   storing the second quantum of data in a second portion of the register; and
   storing the third quantum of data in the first portion of the register.

8. The method of claim 7, wherein the act of transferring the second and third quanta of data further comprises indicating to the device that both the first portion and the second portion of the register comprise valid data.

9. The method of claim 8, wherein the act of indicating to the device comprises:
   asserting a first signal to indicate that the first portion of the register comprises valid data; and
   asserting a second signal to indicate that the second portion of the register comprises valid data.

10. The method of claim 8, wherein the act of indicating to the device comprises asserting a single signal indicating that the first portion of the register comprises valid data and that the second portion of the register will comprise valid data on a successive clock.

11. The method of claim 7, wherein the act of storing the second quantum comprises storing the second quantum of data in a second portion of the register and the act of storing the third quantum of data comprises storing the third quantum of data in the first portion of the register.

12. The method of claim 7, wherein the act of storing the second quantum of data comprises storing 64-bits.

13. The method of claim 2, wherein the act of storing the first quantum of data comprises storing 64-bits.

14. The method of claim 1, further comprising:
   receiving a fourth quantum of data having the width from the memory device; and
   transferring the fourth quantum of data to the device on a next successive clock.

15. The method of claim 14, further comprising indicating to the device that the fourth quantum of data is valid.

16. The method of claim 1, further comprising:
   receiving a fourth and fifth quanta of data from the memory device, each of the fourth and fifth quanta having the width; and
   transferring the fourth and fifth quanta of data to the device on a next successive clock.

17. The method of claim 16, further comprising indicating to the device that the fourth and fifth quanta of data are valid.

18. The method of claim 1, wherein the act of transferring data to the device comprises transferring data to a processor interface.

19. The method of claim 1, wherein the act of transferring data to the device comprises transferring data to a bus interface.

20. A data transfer apparatus, comprising:
   a receiver means for receiving a first quantum of data from a memory device, the first quantum of data having a width;
   a transfer means for transferring the first quantum of data to a device on a first clock signal;
   a second receiver means for receiving a second and third quantum of data from a memory, each of said second and third quantum of data having the width; and
   a second transfer means for concurrently transferring both the second and third quantum of data to the device on a next clock signal.

21. The data transfer apparatus of claim 20, further comprising an indicator means for indicating that the first quantum of data is valid at the first clock signal.

22. The data transfer apparatus of claim 21, wherein the indicator means further indicates that the second quantum of data will be valid at the next clock signal.

23. The data transfer apparatus of claim 21, further comprising a second indicator means for indicating that the second quantum of data will be valid at the next clock signal.

24. A data transfer apparatus, comprising:
   a receiver to receive a first quantum of data from a memory device, the first quantum of data having a width;
   a transfer circuit to transfer the first quantum of data to a device on a first clock signal;
   a second receiver to receive a second and third quantum of data from a memory, each of said second and third quantum of data having the width; and
   a second transfer circuit to concurrently transfer both the second and third quantum of data to the device on a next clock signal.

25. The data transfer apparatus of claim 24, further comprising an indicator circuit to indicate whether the first quantum of data is valid at the first clock signal.

26. The data transfer apparatus of claim 25, wherein the indicative circuit further indicates whether the second quantum of data is valid at the next clock signal.

27. The data transfer apparatus of claim 24, further comprising a second indicator circuit to indicate whether the second quantum of data is valid at the next clock signal.

* * * * *